(12) United States Patent
Hashizume

(10) Patent No.: US 6,541,540 B2
(45) Date of Patent: Apr. 1, 2003

(54) POWDER COATING COMPOSITIONS, METHOD FOR PREPARING THEM AND METHOD FOR FORMING FILMS

(75) Inventor: Yoshiki Hashizume, Kawachi-Nagano (JP)

(73) Assignee: Toyo Aluminium Kabushiki Kaisha, Osaka-fu (JP)

( * ) Notice: Subject to any disclaimer, the term of this patent is extended or adjusted under 35 U.S.C. 154(b) by 52 days.

(21) Appl. No.: 09/799,361

(22) Filed: Mar. 6, 2001

(65) Prior Publication Data

US 2001/0031817 A1 Oct. 18, 2001

(30) Foreign Application Priority Data

Mar. 17, 2000 (JP) .................................. 2000-076891
Oct. 23, 2000 (JP) .................................. 2000-322965

(51) Int. Cl.⁷ .................................................. C08K 3/08
(52) U.S. Cl. ..................... 523/205; 524/439; 524/440; 524/441
(58) Field of Search ..................... 523/205; 524/439, 524/440, 441

(56) References Cited

U.S. PATENT DOCUMENTS

| | | | |
|---|---|---|---|
| 4,138,511 A | 2/1979 | Rolles et al. | |
| 4,318,747 A | * 3/1982 | Ishijima | 106/290 |
| 5,045,114 A | 9/1991 | Bigalk et al. | |
| 5,187,220 A | 2/1993 | Richart et al. | |
| 6,166,123 A | * 12/2000 | Blatter | 524/441 |

FOREIGN PATENT DOCUMENTS

| | | |
|---|---|---|
| JP | 9291230 | 11/1997 |
| WO | WO 99/18161 | 4/1999 |

OTHER PUBLICATIONS

Besold et al., "Encapsulated Metal Pigments . . . " International Conference on powder Coatings (13$^{th}$), 1993, pp. 299–317.

* cited by examiner

*Primary Examiner*—Edward J. Cain
(74) *Attorney, Agent, or Firm*—Nixon & Vanderhye P.C.

(57) ABSTRACT

A powder coating composition comprising metallic flakes having a leafing agent adsorbed on their surfaces, said metallic flakes being mixed with a thermosetting resin powder or deposited onto a surface of a thermosetting resin powder.

A novel powder coating composition of the present invention provides a metallic coating having an excellent metallic luster.

8 Claims, 1 Drawing Sheet ize is less than 5 μm, a risk of dust explosion during

POWDER COATING COMPOSITIONS, METHOD FOR PREPARING THEM AND METHOD FOR FORMING FILMS

FIELD OF THE INVENTION

The present invention relates to a powder coating composition giving an excellent metallic luster, a method for preparing it and a method for forming a film using it.

BACKGROUND OF THE INVENTION

A powder coating has been increasingly applied to automobiles, household appliances, building materials, toys and the like as a low-pollution coating with no organic solvent. When the powder coating is applied to obtain a metallic finish, however, a metallic pigment is hardly aligned parallel to a substrate. Then, a color tone becomes dark and a sufficient metallic luster is not obtained.

For the preparation of the powder metallic coating, a method comprising previously kneading a metallic pigment with a resin and a color pigment by melting, spray drying or the like (a melt blend method), a dry blend method comprising mixing a resin powder with metallic flakes previously powdered by drying, a method comprising depositing a metallic pigment onto a surface of a powder coating resin by means of a brush polisher or the similar means (a bonded method) or the like have been developed (for example, see JP-51137725A, JP-82035214B, U.S. Pat. No. 4,138,511 etc.).

In the melt blend method, a metallic pigment is easily deformed during the kneading step or the step of controlling a particle size of a powder coating by grinding or the like. Then, a satisfactory appearance is not obtained. Since the metallic pigment is ground, an active surface is exposed so that risks of fire, dust explosion and the like are increased.

In the dry blend method, a metallic pigment is hardly deformed. Therefore, this method is more effective than the melt blend method in design. However, it is also difficult to align aluminum flakes parallel to a substrate by this method so that a sufficient metallic luster is not obtained. Because of the difference between a resin powder and metallic flakes in electrostatic property, an initial composition of a powder coating is not identical with a composition of a film prepared by using the powder coating. Thus, the powder coating recovered is reused with difficult.

The bonded method has a merit that an input ratio of metallic flakes in a film is constant since the metallic pigment is deposited onto a surface of a resin and therefore, a powder coating recovered without depositing onto a substrate can be reused. Although a metallic luster is easily obtained since a metallic pigment can be oriented along a surface of a resin according to this method, in practice the surface of the resin is not always aligned parallel to the substrate. Thus, the sufficient metallic luster is not obtained.

SUMMARY OF THE INVENTION

A primary object of the present invention is to overcome defects in appearance including metallic luster, brightness, gloss of a film in the prior metallic powder coating and to provide a powder coating composition meeting basic requirements as a powder coating such as an input ratio of metallic flakes, a coating operability, a recovery efficiency, a chemical resistance and the like.

These and other objects of the present invention can be achieved by a powder coating composition comprising metallic flakes having a leafing agent adsorbed on their surfaces, said metallic flakes being mixed with a thermosetting resin powder or deposited onto a surface of a thermosetting resin powder.

DETAILED DESCRIPTION OF THE INVENTION

Figure 1:
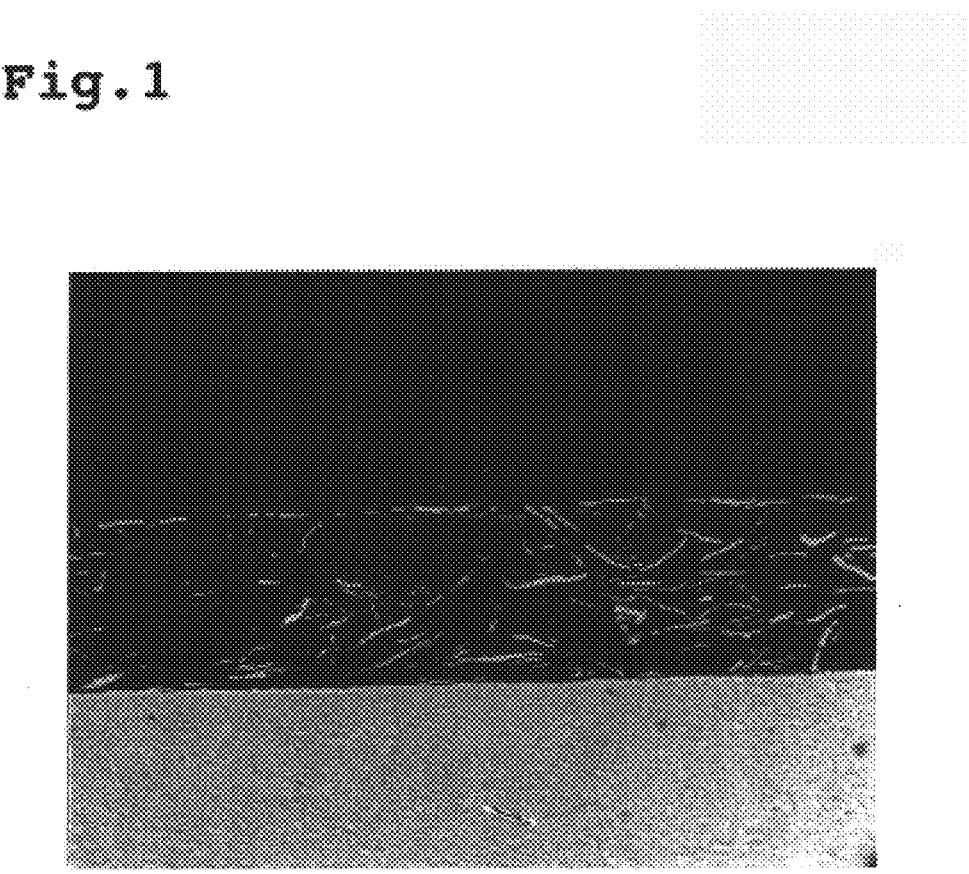
FIG. 1 is a microscopic photograph showing a cross section of the coated panel No. 1 obtained in Example 1 (×400).

The characteristic feature of the present invention is to use metallic flakes having a leafing agent adsorbed thereon by mixing with a thermosetting resin powder in the dry blend method or by depositing onto a surface of a thermosetting resin powder in the bonded method.

Examples of the leafing agent includes dispersing agents comprising a saturated fatty acid containing 12 to 18 carbon atoms such as stearic acid, myristic acid, palmitic acid, lauric acid and the like; polycarboxylic acid such as "Solsperse™" manufactured by Avecia and the like; and their salts. Particularly, a mono- and/or di-orthophosphate ester of aliphatic alcohol is preferable. By using the metallic powder coating composition, a film having an excellent metallic luster or brightness can be obtained. When the coating composition of the present invention is prepared according to the bonded method, it can be reused since an input ratio of metallic flakes into a film is constant. Therefore, the coating composition of the present invention is advantageous with respect to coating costs or environmental pollution. A peeling of a film which is the problem caused by using a phosphate ester in the prior art is used can be overcome by applying the phosphate ester to a powder coating.

Example of the thermosetting resin includes acrylic resin, polyester resin, polyurethane resin and epoxy resin. The use of at least one thermosetting resin selected from the above list is preferable. If necessary, a hardener, a flowability controlling agent, a dispersing agent and the like may be added to the thermosetting resin.

An average particle size of the thermosetting resin powder is 5 to 100 μm, preferably 15 to 60 μm. If the average particle size is less than 5 μm, a risk of dust explosion during preparation or powder coating is increased. And, metallic flakes are hardly deposited onto the surface of the resin in the bonded method. If the average particle size is above 100 μm, a surface smoothness of a film prepared by powder coating is inhibited so that the film of good appearance is not obtained.

Each of the mono-and/or di-orthophosphate ester of aliphatic alcohol has the following structure: mono-orthophosphate ester of aliphatic alcohol: R—O—PO(OH)$_2$ di-orthophosphate ester of aliphatic alcohol: (R—O)$_2$PO (OH) Specifically, the following compounds are exemplified. The use of at least one compound selected from the list is desirable. stearyl acid phosphate, myristyl acid phosphate, palmityl acid phosphate, lauryl acid phosphate, n-decyl acid phosphate, 2-ethylhexyl acid phosphate, oleyl acid phosphate, hexyl acid phosphate, butyl acid phosphate.

Generally the above compound is commercially available in the form of a mixture of mono- and di-orthophosphate esters of aliphatic alcohol. Either the mono-orthophosphate ester of aliphatic alcohol or the di-orthophosphate ester of aliphatic alcohol may be used singly. Alternatively, a mixture of the orthophosphate esters containing different carbon atoms may be used.

The addition of the above compound to the metallic flakes is as described in, for example, JP-58168663A. Although such an addition is mentioned to be effective for improving a chemical resistance and other properties of a metallic pigment, problems such that the use of such metallic flakes in a standard paint significantly lowers physical properties of a film and easily causes a cohesive failure of a film in the tape peeling test or the like may occur. Accordingly, the addition of the above compound to the metallic flakes is not practically utilized. A chemical resistance of the resultant metallic flakes is insufficient.

Since the metallic flakes to which the mono- and/or di-orthophosphate ester of aliphatic alcohol is added are applied to a powder coating which is baked at a high temperature after coating in the present invention, the lowering in physical properties of a film can be inhibited and a film capable of withstanding the practical use can be obtained. The addition of the mono- and/or di-orthophosphate ester of aliphatic alcohol to the metallic flakes previously coated with a resin can give a further improvement in physical properties of a film. Further, it was found that the addition of the mono- and/or di-orthophosphate ester of aliphatic alcohol to the metallic flakes is effective for improving a metallic luster of a film prepared by powder coating. This finding is new.

An aliphatic alcohol used as a starting material of the mono- and di-orthophosphate ester of aliphatic alcohol contains preferably 4 to 18 carbon atoms. If the carbon number is 3 or less, sufficient improvement in color tone is not obtained. On the other hand, if it is 19 or more, physical properties of a film is lowered and problems including an adhesive failure of a film occur.

An added amount of the mono- and/or di-orthophosphate ester of aliphatic alcohol to the metallic flakes is preferably 0.1 to 5 parts by weight, more preferably 0.2 to 3 parts by weight, per 100 parts by weight of the metallic flakes. If it is less than 0.1 part by weight, sufficient improvement in color tone may not be obtained. On the other hand, if it is above 5 parts by weight, physical properties of the film may be lowered so that problems such that a film is peeled may occur.

Example of the metallic flakes includes flakes of aluminum, copper, zinc, iron, chromium, titanium and nickel and their alloys such as bronze and stainless steel. Especially, aluminum flakes are desirable with respect to weather resistance, costs, film properties and the like. In order to obtain a film of good appearance, the metallic flakes has preferably an average particle size ranging from 1 to 100 $\mu$m, more preferably about 3 to 50 $\mu$m and an average thickness ranging from 0.01 to 5 $\mu$m, more preferably 0.02 to 2 $\mu$m. Any substance other than the mono-and/or di-orthophosphate ester of aliphatic alcohol such as fatty acids (ex. oleic acid, stearic acid and the like), aliphatic amines, fatty acid amide, aliphatic alcohols and esters may be adsorbed on the surfaces of the metallic flakes. And, colored metallic flakes having a layer of any other color pigment, an interference film or the like on their surfaces may be used.

Preferably, a resin layer is formed on the surfaces of the metallic flakes. In this case, the mono- and/or di-orthophosphate ester is adsorbed on the resin layer. The formation of the resin layer on the surfaces of the metallic flakes can increase the effect brought about by adding the mono- and/or di-orthophosphate ester of aliphatic alcohol and improve physical properties including a chemical resistance of a film prepared by using a coating composition comprising such metallic flakes. A preferable method for forming a resin layer comprises adding a monomer(s) as described below in a slurry of metallic flakes dispersed in an organic solvent and polymerizing the monomer(s) in the presence of an initiator such as azobisisobutyronitrile, benzoyl peroxide and the like while heating in an inert gas atmosphere so that the resultant polymer is deposited on the surfaces of the metallic flakes, but this method is not exclusive. As the monomer, at least one selected from the following list can be suitably used. (Example of polymerizable monomer) acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentyl glycol diacrylate, tripropylene glycol diacrylate, tetraethylene glycol dicarylate, trimethylolpropane triacrylate, tetramethylolmethane tetraacrylate, pentaerythritol triacrylate, trisacryloxy ethyl phosphate, ditrimethylolpropane tetraacrylate, styrene, $\alpha$-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexene vinyl monooxide, divinylbenzene monooxide A suitable amount of the resin layer formed is preferably 0.1 to 50 parts by weight, more preferably 0.5 to 40 parts by weight, per 100 parts by weight of the metallic flakes. If it is less than 0.1 part by weight, problems such that the improvement in color tone by the acidic phosphate ester is insufficient and that a chemical resistance of a film becomes poor may occur. If it is above 50 parts by weight, the metallic luster or brightness of a film prepared by powder coating may be lowered and a surface smoothness of a film may become worse.

An amount of the metallic flakes mixed with the thermosetting resin powder or deposited onto the thermosetting resin powder is preferably 1 to 20 parts by weight, more preferably 2 to 10 parts by weight, per 100 parts by weight of the thermosetting resin powder. If it is less than 1 part by weight, a sufficient metallic luster or brightness may not be obtained. And, the thickness of a film should be increased in order to hide a substrate. If it is above 20 parts by weight, a gloss of a film may be lost and an appearance of a film may become worse.

According to the bonded method, the method of depositing the metallic flakes having the mono- and/or di-orthophosphate ester of aliphatic alcohol adsorbed thereon onto a surface of a thermosetting resin powder is not limited. The preferable method comprises the steps of coating a dispersion media with a paste-like metallic flakes containing an organic solvent in any dispersing device, contacting with a resin powder so as to transfer and deposit the metallic flakes onto the resin powder and finally drying so as to remove the organic solvent. Since the organic solvent contained in the paste-like metallic flakes dissolves or swells the surfaces of the resin, the metallic flakes tend to be easily deposited onto the surfaces of the resin. Thus, the deposition of the metallic flakes onto the surfaces of the resin is ensured and the form of the particles can be made round.

The kind of the organic solvent contained in the metallic flakes is not particularly limited. Suitably, hydrocarbons, esters, ketones, alcohol, glycol ethers and the like can be used. If the resin is water-soluble, water may be used. Generally, an amount of the organic solvent contained in the paste-like metallic flakes is preferably 0.5 to 90%, more preferably 5 to 50%. If it is too less, the metallic flakes are hardly deposited onto the surface of the resin powder. On the other hand, if it is too much, the resin powder may be coalesced into a large mass.

The dispersion media used is preferably a ball made of steel, alumina, zirconia, glass or the like having a diameter of about 0.5 to 10 mm.

The device used is not particularly limited. Example of the device includes a ball mill, a vibration mill, a stirring mill and the like and a drier having a dispersion mechanism such as a rolling drier, a vibrating drier and a stirring drier. A device capable of dispersing by means of a dispersion media and drying under vacuum is particularly preferable. Preferably, the drying is conducted under conditions such that the pressure in device is 30 Torr or less and the temperature is about 30 to 70° C. At higher pressure and/or lower temperature, a drying efficiency is bad. At higher temperature, the resin powder may be melted and coalesced into a large mass.

Suitably, the powder coating composition of the present invention is applied to a substrate whose surface is previously subjected to a blast treatment, a chemical treatment or the like according to the corona discharging method, the friction charging method or any other powder coating method and then harden by heating at the temperature of 150° C. or more, preferably 170 to 230° C. for 1 minute or more, preferably 5 to 30 minutes. If the heating temperature is lower, problems such as a peeling of a film may occur.

The substrate is suitably a plate of iron, mild steel, aluminum or any other metal.

EXAMPLES

The invention will now be further described by the following, non-limiting examples.

Example 1

To one liter of a slurry containing 100 g (in terms of metal) of commercially available non-leafing aluminum flakes (7640NS manufactured by Toyo Aluminium; non-volatile matter=65%, average particle size=15 μm, average thickness=0.4 μm), 2.5 g of methyl methacrylate, 2.5 g of 1,6-hexanediol diacrylate, 2.5 g of styrene and 2.5 g of glycidyl methacrylate (total of monomers=10 parts by weight/100 parts by weight of aluminum flakes) were added and heated at 80° C. in nitrogen while stirring. After 0.5 g of azo bisisobutyronitrile was added as an initiator, the reaction was continued for 12 hours to polymerize the monomers and to deposit the resultant resin onto the surfaces of the aluminum flakes. The slurry was solid-liquid separated, thereby a paste of a solid matter of 80% was prepared.

To 100 g of the paste-like metallic flakes coated with the resin, 0.8 g of stearyl acid phosphate dissolved in 10 g of mineral spirit was added and mixed. 11 Grams of the resultant paste composition and 1,000 g of an alumina ball having a diameter of 3 mm were charged into a cylindrical container of 12 cm in diameter and 20 cm in length, which was rotated to form a coating layer comprising the paste-like aluminum flakes coated with the resin on the surface of the alumina ball. Thereafter, 100 g of a commercially available thermosetting polyester resin powder for powder coating (TEODUR PE785-900 manufactured by Kuboko Paint) was added to the cylindrical container, which was rotated so as to transfer and deposit the aluminum flakes onto the surface of the thermosetting resin powder. Finally, the ball and the resin were separated through a sieve and the resin was dried with hot air at 40° C. for 2 hours, thereby a metallic powdery coating composition was obtained.

If stearyl acid phosphate was replaced with polycarboxylic acid ("Solsperse" #9000), the resultant powder coating had performances almost identical with those of the powder coating prepared by using stearic acid (Example 27).

Example 2

The procedure as described in Example 1 was repeated to obtain paste-like metallic flakes coated with a resin of a solid matter of 80%. To 100 g of the paste-like metallic flakes coated with the resin, 0.8 g of stearyl acid phosphate dissolved in 10 g of mineral spirit was added and mixed. Then, the mixture was powdered by drying under vacuum in an evaporator.

8 Grams of the thus-powdered aluminum flakes were mixed with 100 g of a thermosetting polyester resin powder for powder coating (TEODUR PE785-900 manufactured by Kuboko Paint) was added in a V-type mixer, thereby a metallic powder coating composition was obtained.

Example 3

To 100 g of non-leafing aluminum flakes (7640NS manufactured by Toyo Aluminium), 0.7 g of stearyl acid phosphate dissolved in 5 g of mineral spirit was added and mixed. 12 grams of the resultant paste-like composition and 1000 g of an alumina ball of 3 mm in diameter were charged into a cylindrical container of 12 cm in diameter and 20 cm in length, which was rotated at 100 rpm to form a coating layer comprising the paste-like aluminum flakes on the surface of the alumina ball. Thereafter, 100 g of a thermosetting polyester resin powder for powder coating (TEODUR PE785-900 manufactured by Kuboko Paint) was added to the cylindrical container, which was rotated so as to transfer and deposit the aluminum flakes to the surface of the thermosetting resin powder. Finally, the ball and the resin were separated through a sieve and the resin was dried with hot air at 40° C. for 2 hours, thereby a metallic powdery coating composition was obtained.

Example 4

To 100 g of non-leafing aluminum flakes (7640NS manufactured by Toyo Aluminium), 0.7 g of stearyl acid phosphate dissolved in 5 g of mineral spirit was added and mixed. The resultant paste composition was powdered by drying under vacuum in an evaporator. 8 grams of the thus-powdered aluminum flakes were mixed with 100 g of a thermosetting polyester resin powder for powder coating (TEODUR PE785-900 manufactured by Kuboko Paint) in a V-type mixer, thereby a metallic powder coating composition was obtained.

Examples 5 to 30 and Comparative Examples 1 to 12

Metallic powder coating compositions of Examples 5 to 30 and Comparative Examples 1 to 12 were prepared according to the bonded method as described in Examples 1 and 3 or the dry blend method as described in Examples 2 and 4, provided that the kind of a metallic pigment composition and the kind and the amount of a thermosetting resin powder were varied as shown in Table 1. In Table 1, 0630M indicates a leafing aluminum paste (non-volatile matter=70%, average particle size=15 μm, average thickness=1.4 μm) manufactured by Toyo Aluminium and RE2600 indicates a coloured aluminum paste (average particle size=18 μm, average thickness=1.7 μm) manufactured by Toyo Aluminium.

Test Procedures

Each of the powdery coatings obtained in Examples 1 to 30 and Comparative Examples 1 to 12 was applied as a base enamel to three tin plates according to the electrostatic powder spraying method (MPSI-C model manufactured by Matsuo Sangyo) at an applied voltage of 90 kV. Two coated plates were baked at 180° C. for 20 minutes to obtain coated panels Nos. 1 and 2. Each of films of these panels had a dry thickness of 50 μm.

Then, a clear resin powder identical with that used in the base enamel was further applied to the coated panel No.2 by powder coating and the coated panel was baked again at 180° C. for 20 minutes. The resultant top clear film had a dry thickness of 40 μm.

To evaluate a metallic luster of the coated panel No. 1, a L value at the angle of incidence of 45° C. and an offset angle from the regular reflection direction of 15° C. (hereinafter referred to "L15value") was determined by means of a colorimeter at variable angle (X-Rite MA 68 manufactured by X-Rite). The higher the L value is, the better the metallic luster is. And, an appearance (gloss) and brightness of a film were evaluated visually based on the following scale:

5 excellent
4 good
3 mediocre
2 inferior
1 bad

An adhesion of the top clear layer of the coated panel No. 2 was tested according to the cross cut tape test (JIS K5400) based on a scale from 1 to 10 wherein 1 is good with no peeling and 0 is bad with 65% or more of peeling.

A chemical resistance of the film of the coated panel No. 1 was tested according to JIS K5400 based on the following scale:

5 excellent
4 good
3 mediocre
2 inferior
1 bad

As a test liquid for alkali resistance, an aqueous 5% sodium carbonate solution was used. As a test liquid for acid resistance, an aqueous 5% sulfuric acid solution was used. Each of these tests was conducted for 24 hours.

The coating was recovered from the third tin plate before baking and then heated at 800° C. in an air to be ashed. An amount of a metal in an ash is quantitated by EDTA titration analysis, from which an input ratio of the metallic flakes was calculated by dividing an amount (%) of a metal analyzed with an amount (%) of the metal in the initial composition. Results are shown in Table 2.

FIG. 1 shows a microscopic photograph showing a cross section of a coated panel No. 1 obtained in Example 1 (×400), from which it is observed that aluminum flakes are distributed within the film and on the surface thereof and they give an excellent brightness.

An average particle size was tested according to the method for determining a particle size distribution by laser diffraction. And an average thickness was tested by actually measuring any 10 particles in the SEM photograph and calculating an average.

TABLE 1

Formulations of Powder Coating Compositions kind of metallic coating composition

| | kind of starting metallic flakes | resin coat amount (wt %/Al flakes) | kind of leafing agent | added amount of leafing agent (wt %/Al flakes) | kind of resin powder | Al flakes/resin powder (wt) | bonded method (B) or dry blend method (D) |
|---|---|---|---|---|---|---|---|
| Ex.1  | 7640NS | 10   | stearyl acid phosphate       | 1.1  | polyester   | 7.2/100  | B |
| Ex.2  | 7640NS | 10   | stearyl acid phosphate       | 1.1  | polyester   | 7.2/100  | D |
| Ex.3  | 7640NS | —    | stearyl acid phosphate       | 1.0  | polyester   | 8.0/100  | B |
| Ex.4  | 7640NS | —    | stearyl acid phosphate       | 1.0  | polyester   | 7.9/100  | D |
| Ex.5  | 7640NS | 10   | lauryl acid phosphate        | 1.1  | polyester   | 7.2/100  | B |
| Ex.6  | 7640NS | 10   | 2-ethylhexyl acid phosphate  | 1.1  | polyester   | 7.2/100  | C |
| Ex.7  | 7640NS | —    | stearyl acid phosphate       | 3.0  | polyester   | 7.8/100  | B |
| Ex.8  | 7640NS | 10   | butyl acid phosphate         | 1.1  | polyester   | 7.2/100  | B |
| Ex.9  | 7640NS | 10   | eicosyl acid phosphate       | 1.1  | polyester   | 7.2/100  | B |
| Ex.10 | 0630M  | —    | lauryl acid phosphate        | 1.0  | acrylic     | 4.0/100  | B |
| Ex.11 | RE2600 | —    | lauryl acid phosphate        | 1.0  | polyester   | 8.0/100  | B |
| Ex.12 | 7640NS | 10   | lauryl acid phosphate        | 3.3  | polyester   | 7.1/100  | B |
| Ex.13 | 7640NS | 10   | lauryl acid phosphate        | 6.6  | polyester   | 7.0/100  | B |
| Ex.14 | 7640NS | 10   | lauryl acid phosphate        | 0.22 | polyester   | 7.3/100  | B |
| Ex.15 | 7640NS | 10   | lauryl acid phosphate        | 0.06 | polyester   | 7.3/100  | B |
| Ex.16 | 7640NS | 0.2  | lauryl acid phosphate        | 1.0  | polyester   | 8.0/100  | B |
| Ex.17 | 7640NS | 0.05 | lauryl acid phosphate        | 6.0  | polyester   | 7.7/100  | B |
| Ex.18 | 7640NS | 30   | lauryl acid phosphate        | 0.26 | polyester   | 6.1/100  | B |
| Ex.19 | 7640NS | 60   | lauryl acid phosphate        | 0.08 | polyester   | 5.0/100  | B |
| Ex.20 | 7640NS | 10   | lauryl acid phosphate        | 1.1  | acrylic     | 7.2/100  | B |
| Ex.21 | 7640NS | 10   | lauryl acid phosphate        | 1.1  | polyurethane| 7.2/100  | B |
| Ex.22 | 7640NS | 10   | lauryl acid phosphate        | 1.1  | polyester   | 3.6/100  | B |
| Ex.23 | 0630M  | —    | lauryl acid phosphate        | 1.0  | polyester   | 0.5/100  | B |
| Ex.24 | 7640NS | 10   | lauryl acid phosphate        | 1.1  | polyester   | 13.5/100 | B |

TABLE 1-continued

Formulations of Powder Coating Compositions

| | kind of starting metallic flakes | resin coat amount (wt %/Al flakes) | kind of leafing agent | added amount of leafing agent (wt %/Al flakes) | kind of resin powder | Al flakes/ resin powder (wt) | bonded method (B) or dry blend method (D) |
|---|---|---|---|---|---|---|---|
| Ex.25 | 7640NS | 10 | lauryl acid phosphate | 1.1 | polyester | 22.6/100 | B |
| Ex.26 | 7640NS | 10 | 2-ethylhexyl acid phosphate | 1.1 | acrylic | 7.2/100 | D |
| Ex.27 | 7640NS | 10 | stearic acid | 3.3 | polyester | 7.1/100 | D |
| Ex.28 | 7640NS | 10 | butyl acid phosphate | 1.1 | polyester | 18.0/100 | D |
| Ex.29 | RE2600 | — | lauryl acid phosphate | 1.0 | polyurethane | 7.9/100 | D |
| Ex.30 | 0630M | — | lauryl acid phosphate | 1.0 | polyester | 7.9/100 | D |
| Comp. Ex.1 | 7640NS | — | — | — | Polyester | 8.0/100 | B |
| Comp. Ex.2 | 7640NS | — | — | — | Polyester | 8.0/100 | D |
| Comp. Ex.3 | 7640NS | 10 | — | — | Polyester | 8.0/100 | B |
| Comp. Ex.4 | 7640NS | 10 | — | — | Polyester | 7.3/100 | D |
| Comp. Ex.5 | 7640NS | 10 | — | — | Acrylic | 8.0/100 | B |
| Comp. Ex.6 | 7640NS | 10 | — | — | Acrylic | 7.3/100 | D |
| Comp. Ex.7 | 7640NS | 10 | — | — | Polyurethane | 8.0/100 | B |
| Comp. Ex.8 | 7640NS | 10 | — | — | Polyurethane | 7.3/100 | D |
| Comp. Ex.9 | RE2600 | — | — | — | Polyester | 8.0/100 | B |
| Comp. Ex.10 | RE2600 | — | — | — | Polyester | 7.3/100 | D |
| Comp. Ex.10 | 0630M | — | — | — | Acrylic | 4/100 | B |
| Comp. Ex.12 | 0630N | — | — | — | Acrylic | 3.6/100 | D |

TABLE 2

Evaluation of Powder Coatings

| | L15 value | visual evaluation | | adhesion | Chemical resistance of film | | Input ratio of metallic flakes |
|---|---|---|---|---|---|---|---|
| | | appearance | brightness | | Alkali | acid | |
| Ex.1 | 179 | 5 | 5 | 10 | 5 | 5 | 100 |
| Ex.2 | 210 | 5 | 5 | 10 | 5 | 5 | 66 |
| Ex.3 | 145 | 5 | 3 | 10 | 3 | 4 | 98 |
| Ex.4 | 123 | 5 | 3 | 10 | 3 | 4 | 52 |
| Ex.5 | 177 | 5 | 5 | 10 | 5 | 5 | 99 |
| Ex.6 | 165 | 5 | 4 | 10 | 5 | 5 | 99 |
| Ex.7 | 170 | 5 | 5 | 8 | 3 | 4 | 97 |
| Ex.8 | 140 | 5 | 3 | 10 | 5 | 5 | 100 |
| Ex.9 | 175 | 5 | 5 | 8 | 5 | 5 | 100 |
| Ex.10 | 160 | 5 | 5 | 8 | 3 | 4 | 96 |
| Ex.11 | 97 | 5 | 5 | 10 | 5 | 5 | 100 |
| Ex.12 | 186 | 5 | 5 | 9 | 5 | 5 | 99 |
| Ex.13 | 185 | 5 | 5 | 6 | 5 | 5 | 100 |
| Ex.14 | 150 | 5 | 4 | 10 | 5 | 5 | 100 |
| Ex.15 | 145 | 5 | 3 | 10 | 5 | 5 | 99 |
| Ex.16 | 152 | 5 | 4 | 10 | 4 | 5 | 98 |
| Ex.17 | 144 | 5 | 3 | 9 | 3 | 4 | 97 |
| Ex.18 | 169 | 5 | 4 | 10 | 5 | 5 | 100 |
| Ex.19 | 152 | 5 | 3 | 10 | 5 | 5 | 100 |
| Ex.20 | 116 | 5 | 3 | 10 | 5 | 5 | 99 |
| Ex.21 | 181 | 5 | 5 | 10 | 5 | 5 | 98 |
| Ex.22 | 101 | 5 | 3 | 10 | 5 | 5 | 100 |
| Ex.23 | 137 | 5 | 3 | 10 | 5 | 5 | 99 |
| Ex.24 | 187 | 5 | 5 | 9 | 4 | 5 | 97 |
| Ex.25 | 184 | 5 | 5 | 8 | 3 | 5 | 98 |

TABLE 2-continued

Evaluation of Powder Coatings

| | L15 value | visual evaluation | | adhesion | Chemical resistance of film | | Input ratio of metallic flakes |
|---|---|---|---|---|---|---|---|
| | | appearance | brightness | | Alkali | acid | |
| Ex.26 | 191 | 5 | 4 | 10 | 5 | 5 | 54 |
| Ex.27 | 175 | 4 | 4 | 8 | 5 | 5 | 48 |
| Ex.28 | 155 | 5 | 4 | 10 | 4 | 5 | 45 |
| Ex.29 | 105 | 5 | 5 | 10 | 5 | 5 | 74 |
| Ex.30 | 169 | 5 | 3 | 10 | 3 | 5 | 65 |
| Comp.Ex.1 | 105 | 5 | 2 | 8 | 2 | 5 | 90 |
| Comp.Ex.2 | 67 | 3 | 1 | 8 | 2 | 3 | 30 |
| Comp.Ex.3 | 112 | 5 | 3 | 10 | 5 | 5 | 99 |
| Comp.Ex.4 | 135 | 4 | 4 | 10 | 5 | 5 | 51 |
| Comp.Ex.5 | 75 | 5 | 2 | 10 | 5 | 5 | 100 |
| Comp.Ex.6 | 81 | 4 | 2 | 10 | 5 | 5 | 49 |
| Comp.Ex.7 | 72 | 5 | 2 | 10 | 5 | 5 | 99 |
| Comp.Ex.8 | 90 | 4 | 3 | 10 | 5 | 5 | 51 |
| Comp.Ex.9 | 65 | 5 | 2 | 10 | 5 | 5 | 99 |
| Comp.Ex.10 | 78 | 4 | 3 | 10 | 5 | 5 | 59 |
| Comp.Ex.11 | 103 | 5 | 3 | 6 | 2 | 3 | 91 |
| Comp.Ex.12 | 121 | 3 | 4 | 8 | 2 | 3 | 63 |

Example 31

The powder coating composition obtained in Example 3 was applied by electrostatic powder spraying and the resultant coated panel was baked at 160° C. for 20 minutes. Thereafter, a clear resin powder identical with that used in the above coating composition was applied to the coated panel by powder coating and baked again at 160° C. for 20 minutes.

Comparative Example 13

The powder coating composition obtained in Example 3 was applied by electrostatic powder spraying and the resultant coated panel was baked at 140° C. for 20 minutes. Thereafter, a clear resin powder identical with that used in the above coating composition was applied to the coated panel by powder coating and baked again at 140° C. for 20 minutes.

Comparative Example 14

The powder coating composition obtained in Example 1 was applied by electrostatic spraying and the resultant coated panel was baked at 140° C. for 20 minutes. Thereafter, a clear resin powder identical with that used in the above coating composition was applied to the coated panel by powder coating and baked again at 140° C. for 20 minutes.

The coated panel obtained in each of Example 31 and Comparative Examples 13 and 14 was tested for adhesion according to the cross cut tape test. Scores of Example 31 and Comparative Examples 13 and 14 are 8, 3 and 3, respectively.

What is claimed is:

1. A powder coating composition comprising metallic flakes having a leafing agent adsorbed on their surfaces, and a thermosetting resin powder wherein the leafing agent comprises a mono- and/or di-orthophosphate ester of aliphatic alcohol.

2. The powder coating composition of claim 1, wherein the metallic flakes are deposited onto a surface of the thermosetting resin powder.

3. The powder coating composition of claim 1, wherein an amount of the metallic flakes is 1 to 20 parts by weight per 100 parts by weight of the thermosetting resin powder.

4. The powder coating composition of claim 1, wherein the mono- and/or di-orthophosphate ester of aliphatic alcohol is derived from an aliphatic alcohol containing 4 to 18 carbon atoms.

5. The power coating composition of claim 1, wherein an amount of the leafing agent is 0.1 to 5 parts by weight per 100 parts by weight of the metallic flakes.

6. The powder coating composition of claim 1, wherein a resin layer in an amount of 0.1 to 50 parts by weight per 100 parts by weight of the flakes is further formed on the surfaces of the metallic flakes.

7. A method for preparing the powder coating composition of claim 1, comprising the steps of:
   mixing a leafing agent in the form of a liquid or a solution with a paste-like composition of metallic flakes in a solvent to prepare paste-like metallic flakes having the leafing agent adsorbed onto the surfaces thereof;
   dispersing the mixture into a dispersion media to coat the surface of the dispersion media with a layer of the metallic flakes;
   contacting the dispersion media with a thermosetting resin powder to transfer and deposit the metallic flakes onto the surface of the resin powder; and
   drying to remove the solvent.

8. A method for forming a film on the surface of a substrate, comprising the steps of:
   powder coating the surface of the substrate with the powder coating composition of claim 1; and
   hardening a thermosetting resin at the temperature of 150° C. or more.

* * * * *